United States Patent [19]
Smith

[11] Patent Number: 6,056,294
[45] Date of Patent: May 2, 2000

[54] SELF-ENERGIZING ONE PIECE SEAL

[75] Inventor: David P. Smith, Joliet, Ill.

[73] Assignee: Caterpillar Inc., Peoria, Ill.

[21] Appl. No.: 09/063,567

[22] Filed: Apr. 21, 1998

[51] Int. Cl.[7] .................................................... F16J 15/16
[52] U.S. Cl. ........................ 277/587; 277/626; 277/641; 277/644; 277/648; 277/650
[58] Field of Search ..................... 277/500, 529, 277/448, 453, 454, 465, 602, 612, 615, 626, 627, 641, 642, 644, 648, 650, 910, 587

[56] References Cited

U.S. PATENT DOCUMENTS

| | | | |
|---|---|---|---|
| 1,534,386 | 4/1925 | Heslewood | 277/457 |
| 2,480,513 | 8/1949 | Schnuck . | |
| 2,762,668 | 9/1956 | Meijer et al. . | |
| 3,001,806 | 9/1961 | Macks . | |
| 3,062,557 | 11/1962 | Underwood | 277/630 |
| 3,190,662 | 6/1965 | Mayfield . | |
| 3,228,705 | 1/1966 | Underwood . | |
| 3,310,316 | 3/1967 | Smyers . | |
| 3,476,396 | 11/1969 | Buhl . | |
| 3,522,949 | 8/1970 | Wells . | |
| 3,895,815 | 7/1975 | Panigati | 277/448 |
| 4,032,159 | 6/1977 | Zitting . | |
| 4,062,495 | 12/1977 | Luck | 239/559 |
| 4,109,923 | 8/1978 | Tuckmantel | 277/612 |
| 4,421,330 | 12/1983 | Burke . | |
| 4,452,464 | 6/1984 | Furuhama | 277/457 |
| 4,681,326 | 7/1987 | Kubo . | |

FOREIGN PATENT DOCUMENTS

| | | | |
|---|---|---|---|
| 0040856A1 | 12/1981 | European Pat. Off. | F16J 15/32 |
| 0321280A2 | 6/1989 | European Pat. Off. | F16J 15/16 |
| 1436480 | 7/1966 | France . | |
| 1984865 | 1/1968 | Germany . | |
| 2107203 | 4/1972 | Germany | F16J 15/16 |
| 3833689A1 | 4/1990 | Germany | F16J 15/16 |
| 769585 | 3/1957 | United Kingdom . | |

*Primary Examiner*—Anthony Knight
*Assistant Examiner*—Alison K. Pickard
*Attorney, Agent, or Firm*—John W. Grant; J. W. Burrows

[57] ABSTRACT

A self energizing one piece seal has an annular seal body and a multiplicity of circumferentially spaced delta shaped resilient tabs extending inwardly from the annular body. The seal is adapted to be placed in an annular groove of a cylindrical member so that a circumferential seal face is initially biased into sealing engagement with a bore of a body and a radial seal face is initially biased into sealing engagement with a radial face of the groove by the resilient tabs.

6 Claims, 3 Drawing Sheets

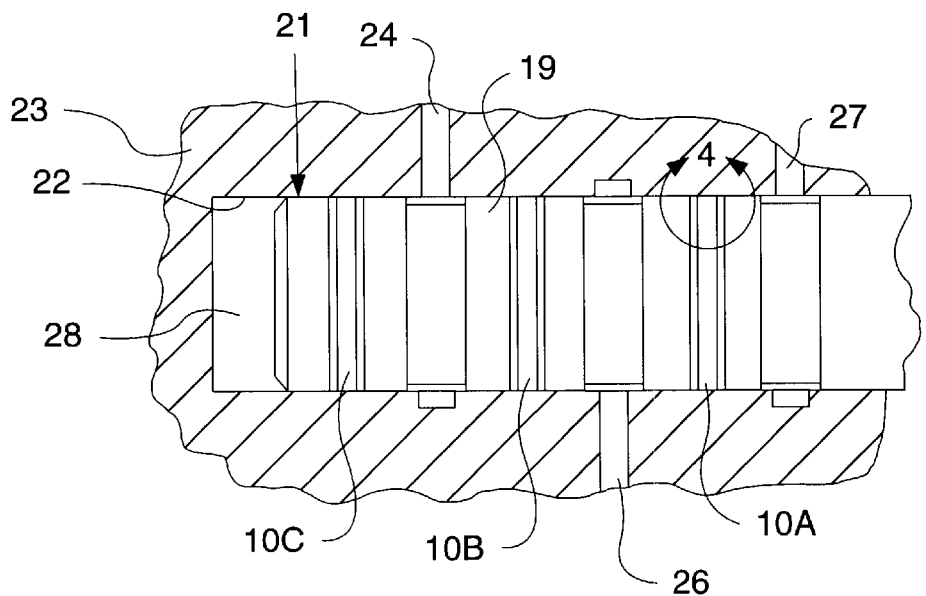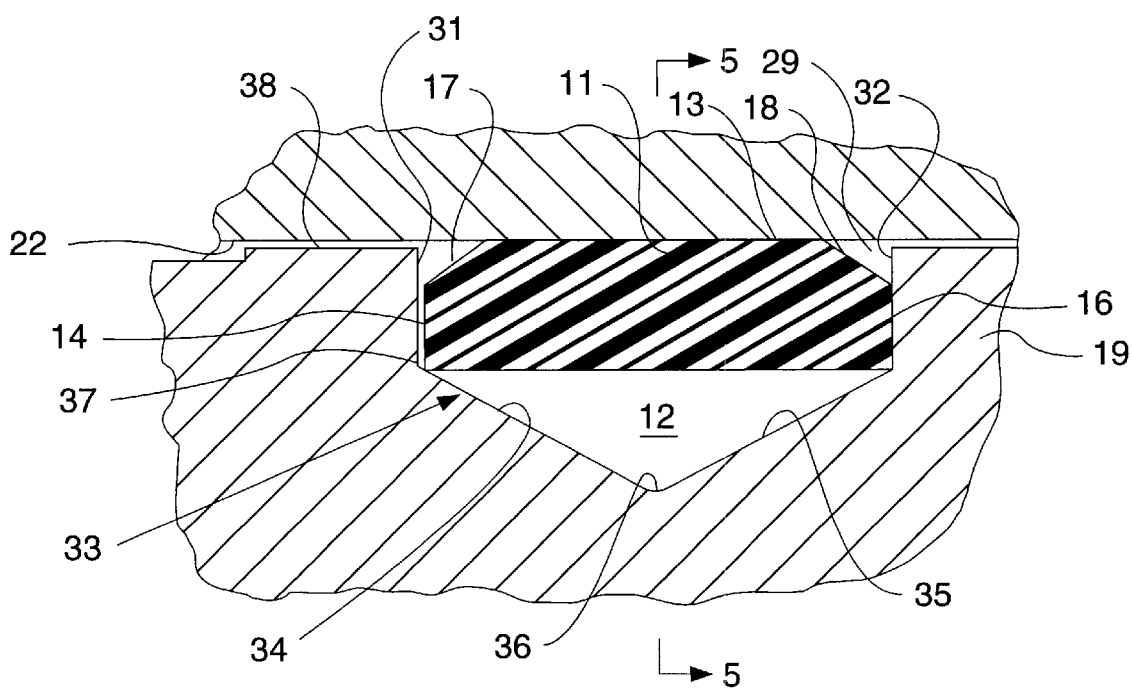

SELF-ENERGIZING ONE PIECE SEAL

TECHNICAL FIELD

This invention relates generally to hydraulic seals and more particularly to a slightly resilient synthetic resinous one piece seal which is self-energized into sealing contact with a mating surface.

BACKGROUND ART

Cartridge type hydraulic valves typically have a cylindrical sleeve inserted into a bore of a valve body to control fluid flow through several passages opening into the bore. Seals are commonly disposed in annular grooves formed in the sleeve to isolate the passages from each other. One type of seal used in such applications is called an "O" ring and is made from a resilient elastomeric material. One of the problems encountered is that sharp edges are generated where the passages open into the bore and the elastomeric seals are susceptible to cuts and/or abrasion as they pass by the passages during assembly. To prevent damage to the seals during assembly, the valve body is sometimes provided with a stepped bore to minimize the number of times that the seal must pass by the opening of the passages into the bore. However the stepped bore takes up more space, increases sleeve and valve body stresses and is more costly to machine.

Some of the newer cartridge valves use sleeves made from a different material than the valve body. For example the body may be made from a metallic material and the sleeve made from plastic. To prevent distortion of the sleeve due to the differences in thermal expansion, the size of an annular gap existing between the sleeve and the bore is increased. A problem encountered therewith is that the elastomeric "O" ring can be extruded into the larger gap by pressurized fluid. This problem has been minimized somewhat by using a two piece seal assembly consisting of a plastic seal element and an elastomeric energizer which resiliently biases the plastic seal into contact with the bore surface. However the two piece seals are more difficult to assemble properly and have a larger profile that requires a deeper or wider annular groove formed in the sleeve. The larger groove in the sleeve increases the stress concentration in the sleeve which often results in a larger cartridge valve.

Thus it would be desirable to have a one piece seal which is self-energizing to cause initial sealing between the seal, the bore surface and the annular groove and which is made from a material having sufficient rigidity to permit the seal to pass by an edge many times without being cut or abraded and to prevent extrusion into the annular gap between the sleeve and bore while having sufficient resilience to permit assembly into the groove and to compensate for thermal expansion differences between the sleeve and the valve body.

The present invention is directed to overcoming one or more of the problems set forth above.

DISCLOSURE OF THE INVENTION

In one aspect of the present invention, a self-energizing one piece seal comprises an annular seal body having a circumferential seal face and a radial seal face and a multiplicity of circumferentially spaced delta shaped resilient tabs extending radially inward from the annular body.

BRIEF DESCRIPTION OF THE DRAWINGS

FIG. 3 is an elevational view illustrating a hydraulic valve utilizing the present invention;

FIG. 4 is a sectional view of a portion of FIG. 3 encircled by the line 4; and

BEST MODE FOR CARRYING OUT THE INVENTION

Figure 1:
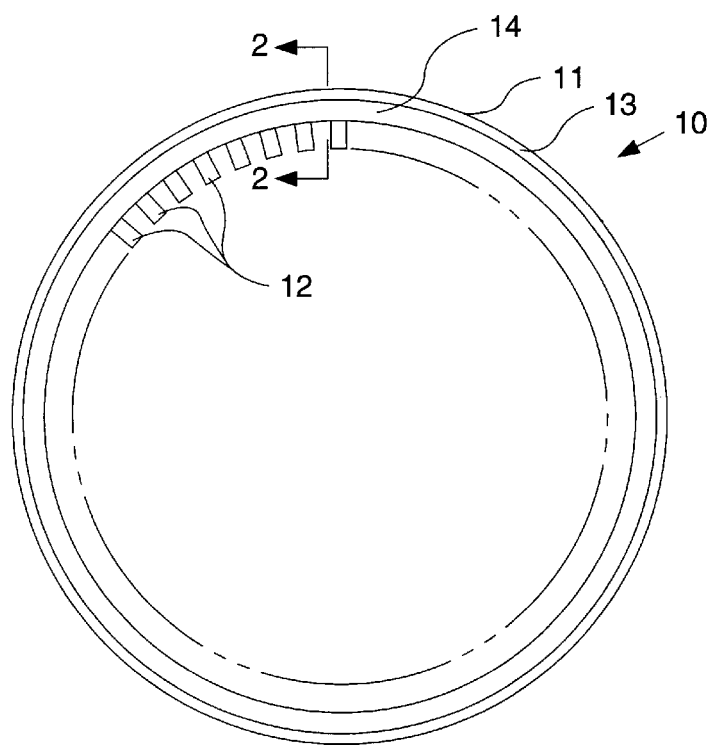
FIG. 1 is a diagrammatic elevational view of an embodiment of the present invention.
Figure 2:
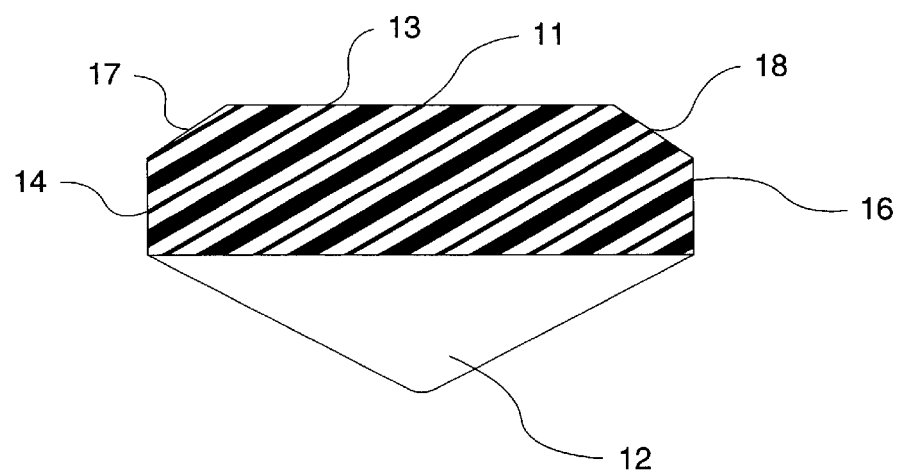
FIG. 2 is a cross sectional view taken along line 2—2 of FIG.

Referring to the drawings, a self-energizing one piece seal 10 has an annular body 11 and a multiplicity of circumferentially spaced delta shaped resilient tabs 12 extending radially inward from the body 11 and each oriented parallel with the axis of the annular seal body 11. The body 11 has a circumferential seal face 13, a pair of parallel radial seal faces 14,16, and a pair of beveled surfaces 17,18 at the intersection of the circumferential face and the radial faces 14,16. The seal 10 is preferably composed of a low friction synthetic resin material which is slightly resilient, but which has anti-extrusion properties. Some examples of such materials include nylon, glass filled nylon, thermoplastics or other high strength plastics.

Figure 5:
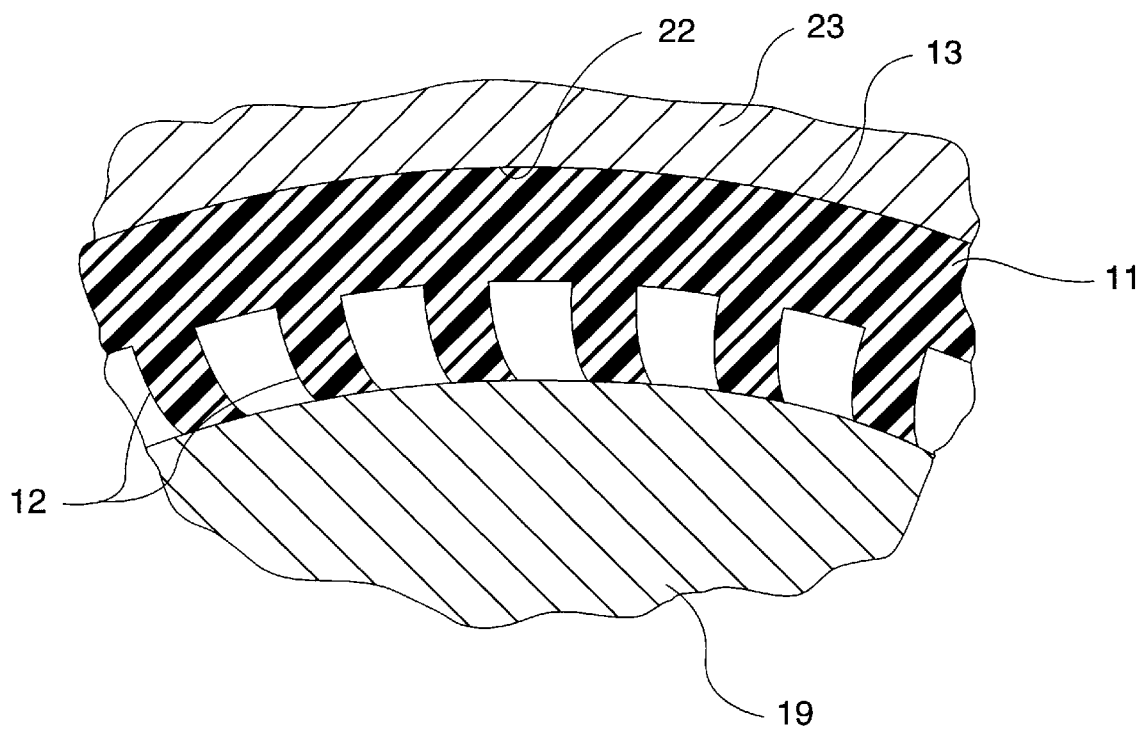
FIG. 5 is a sectional view taken along line 5—5 of FIG. 4.

One usage of the seal 10 is illustrated in FIGS. 3–5 which disclose a cylindrical sleeve 19 of a hydraulic cartridge valve 21 placed within a bore 22 of a valve body 23 for controlling fluid flow between an inlet passage 24, a control passage 26 and a tank passage 27 in a conventional manner. In this embodiment, fluid pressure in the inlet passage 24 is typically greater than the fluid pressure in the control passage 26 and a drain chamber 28 at the left end of the sleeve 19 and fluid pressure in the control passage 26 is greater than fluid pressure in the tank passage 27. Thus one seal 10a is positioned between the control and tank passages 26 and 27 to seal the control passage from the tank passage, another seal 10b is positioned between the control and inlet passages 26 and 24 to seal the inlet passage from the control passage and another seal 10c is positioned between the inlet passage 24 and the drain chamber 28 to seal the inlet passage from the drain chamber.

Referring more specifically to FIG. 4, the seal 10a for example is seated in an annular groove 29 formed in the sleeve 19. The groove 29 has a pair of parallel radial faces 31,32 and a delta shaped bottom 33 defined by a pair of converging beveled surfaces 34,35 terminating at a radius 36. The depth of the groove 29 and the angle of the beveled surfaces 34,35 are selected to deflect the tabs 12 as shown in FIG. 5 so that the tabs 12 generate a generally radial outward and an axial rightward force on the body 11 when the seal 10a is seated in the groove 29 and the sleeve 19 is positioned in the bore 22 of the body 23. The radial outward force biases the circumferential seal face 13 into initial sealing engagement with the bore 22 and the axial force on the seal 10a biases the radial face 16 into initial sealing engagement with the radial face 32 of the groove 29. The axial force is a result of the pressure acting on the faces 14 and 17 creating a force greater than that created by the pressure acting on the faces 16 and 18. Once sealed the forces on the sealing faces 13 and 16 increase with increased pressure. The axial force also produces a small radial gap 37 (about 0.1 to 0.3 mm) between the radial seal face 14 of the seal and the face 31 the groove. A radial gap 38 (about 0.02 to 0.08 mm) is also shown between the sleeve 19 and the bore to compensate for thermal expansion differences between the sleeve and the body 23.

Industrial Applicability

In use, the circumferential seal face 13 is self-energized into initial sealing engagement with the bore 22 of the body 23 by the tabs 12. Thus pressurized fluid from the control passage 26 passes through the radial gap 38 and into the axial gap 37 where it acts on the radial seal face 14 and the beveled surface 17 to generate an axial hydrostatic biasing force acting on the body 11. This applies positive sealing between the radial seal face 16 of the seal and the radial face 32 of the groove 29. The axial gap 37 allows pressurized fluid from the control passage to enter the spaces between the tabs 12 to act on the inner surface of the body 11 of the seal. This generates a radially outward hydrostatic force to provide additional positive sealing between the circumferential seal face 13 and the bore 22. The beveled surface 18 of the seal reduces the contact area of the circumferential seal face 13 to insure that a positive hydrostatic sealing force is applied to the circumferential seal face 13. The beveled surface 18 also reduces the contact area of the radial seal face 13 to insure that a positive hydrostatic sealing force is applied to the radial seal face 13. The size and angle of the beveled surface 18 can be varied so that sealing occurs with pressure compensated loads which can minimize friction of the seal face 13 with the bore 22.

In view of the above, it is readily apparent that the structure of the present invention provides an improved one piece seal which is self-energized into initial sealing engagement with a bore of a body creating pressure loads that also seals a radial face with a radial face of a groove. The seal is made from a slightly resilient resinous material which permits assembly into the groove, but which has sufficient rigidity to permit the seal to pass by edges many times without being damaged or extruded into the annular gap normally existing between the sealed components. The delta shaped resilient tabs of the seal act as energizers to establish the initial sealing and compensate for thermal expansion differences of the sealed components.

Other aspects, objects and advantages of this invention can be obtained from a study of the drawings, the disclosure and the appended claims.

What is claimed is:

1. A self-energizing one piece seal comprising:

an annular seal body having an axis, a circumferential seal face extending parallel with the axis of the annular seal body and a radial seal face; and a multiplicity of circumferentially spaced delta shaped resilient tabs extending radially inward from the annular body and oriented parallel with the axis of the annular seal body.

2. The one piece seal of claim 1 wherein the body has another radial seal face spaced from the first radial seal face and a pair of beveled surfaces at the intersection of the circumferential seal face and the radial seal faces.

3. The one piece seal of claim 2 wherein the seal is made from a synthetic resin material which is slightly resilient and has anti-extrusion and anti-cutting properties.

4. The one piece seal of claim 1 in combination with a body having a bore and a cylindrical member disposed in the bore, the cylindrical member having an annular groove defined therein and the one piece seal is seated in the annular groove.

5. The one piece seal of claim 4 wherein the annular groove has a delta shaped bottom defined by a pair of converging beveled surfaces.

6. The one piece seal of claim 5 wherein the depth of the annular groove is selected to cause the tabs to deflect so that the tabs generate a generally radial outward force on the body when the sleeve is inserted into the bore of the body.

* * * * *